US006916426B2

(12) United States Patent
Van Slyke et al.

(10) Patent No.: US 6,916,426 B2
(45) Date of Patent: Jul. 12, 2005

(54) METHOD OF WASTE TREATMENT

(75) Inventors: Victor Van Slyke, Vancouver (CA);
Hubert Timmenga, Vancouver (CA);
Steve Helle, Vancouver (CA); Paul Watkinson, Vancouver (CA); Xiaotao Bi, Vancouver (CA)

(73) Assignee: ATD Waste Systems Inc., Vancouver (CA)

( * ) Notice: Subject to any disclaimer, the term of this patent is extended or adjusted under 35 U.S.C. 154(b) by 161 days.

(21) Appl. No.: 10/119,719

(22) Filed: Apr. 11, 2002

(65) Prior Publication Data

US 2002/0158024 A1 Oct. 31, 2002

(30) Foreign Application Priority Data

Apr. 5, 2001  (CA) .............................................. 2343832

(51) Int. Cl.⁷ ................................ C02F 9/00; C05F 3/00
(52) U.S. Cl. .......................... 210/666; 71/21; 210/667; 210/669; 210/710; 210/726; 210/903; 210/906; 210/916
(58) Field of Search ................................ 71/11, 12, 15, 71/21; 210/665, 666, 667, 669, 681, 710, 718, 724, 725, 726, 727, 903, 906, 916

(56) References Cited

U.S. PATENT DOCUMENTS

| | | | | |
|---|---|---|---|---|
| 3,723,308 A | * | 3/1973 | Breck | 210/681 |
| 5,914,040 A | * | 6/1999 | Pescher et al. | 210/638 |
| 6,083,386 A | * | 7/2000 | Lloyd | 210/195.1 |
| 6,387,145 B1 | * | 5/2002 | Miele et al. | 71/6 |
| 6,409,788 B1 | * | 6/2002 | Sower | 71/11 |

* cited by examiner

Primary Examiner—Ivars C. Cintins
(74) Attorney, Agent, or Firm—Brian M. Long

(57) ABSTRACT

A method of treating an animal waste slurry so as to efficiently extract nutrients, and which can be performed in a zero-discharge system, comprises flocculating the slurry, processing, e.g. filtering, the flocculated slurry to separate liquid from solid material, drying the solid material, processing the liquid to extract ammonium, phosphorous and potassium from the slurry, all within 24 hours, and preferably on average within 12 hours, of production of the waste material by animals. Since the urates of potassium and ammonium in the slurry take a few hours to break down, they remain in crystalline form and therefore a larger portion of the total amount of potassium and ammonium in the slurry can be extracted.

11 Claims, 3 Drawing Sheets

METHOD OF WASTE TREATMENT

BACKGROUND OF THE INVENTION

1. Field of the Invention

The present invention relates to a method of waste treatment and, more particularly, to the treatment of animal waste in the form of a slurry produced, for example, by hogs and dairy cattle.

2. Description of the Related Art

In modern agricultural production, it has become usual to employ an agricultural establishment as an intensive feeding operation for raising hundreds or even thousands of animals, e.g. hogs, dairy, poultry and beef animals, at a single location. Consequently, large amounts of animal waste matter are produced at such locations, and the disposal of this waste matter in a hygienic and inoffensive manner is problematic.

More particularly, it has been suggested that hogs produce more than four times as much waste as humans. It has, for example, been planned to initiate a hog farm containing 2,000,000 hogs, which will produce an amount of waste equivalent to that produced by the city of Los Angeles. The current pig population of North Carolina is four times that number. Recent accidents in North Carolina, in which millions of gallons of pig excreta were released into the countryside, have drawn attention to the problems involved in the disposal of such waste. Applications for permits to construct large piggeries have been denied because of concerns about odours and waste disposal.

Animal waste, including hog manure, has traditionally been disposed of by spreading it over agricultural land as a liquid fertilizer and, for sufficiently large cropped land bases, this method of disposal can be performed safely. However, in areas of high population density or where multiple farms are closely clustered, and the land base is therefore relatively small, problems arise. For example, excess nutrients cannot be absorbed by crops and leach into ground water and surface water.

When land application is prevented, e.g. because the ground is frozen or saturated with water and/or nutrients, the waste must be stored, usually in large pits, with consequential costs and environmental risk.

As an alternative to land disposal, it is also common practice to compost the waste. For this purpose, the waste is separated into solid and liquid by the use of inclined screens, sometimes followed by the use of belt or filter presses. These methods produce an output containing about 45% solid material at best, and this is then mixed with a bulking material to facilitate aeration and an appropriate C:N ratio, and deposited in windrows for stabilization, over a period of about 45 to 60 days, by composting. This process does not ensure that pathogens in the waste are killed and the windrows are often odorous and may attract birds, rodents and vermin. The liquid still has to be dealt with through land application.

The challenges involved in the treatment of animal waste include the destruction of pathogens, the controlled extraction of ammonium and plant nutrients, and the disposal of organic matter.

It is known, from U.S. Pat. No. 4,093,544, issued Jun. 6, 1978, to David S. Ross, the disclosure of which is incorporated herein by reference, to remove ammonium from wastewater by firstly increasing the pH value of the wastewater, then desorbing ammonium by vacuum and subsequently absorbing the desorbed ammonium in liquid having a pH value and temperature substantially less than that of the original wastewater.

In U.S. Pat. No. 5,914,040, issued Jun. 22, 1999, to Yvette Pescher et al., there is disclosed a process for the purification of a medium containing organic waste, for example pig manure, by subjecting the medium to treatment with an oxidizing agent, treatment with a flocculating agent and treatment with at least one polyelectrolyte. The effluent thus obtained is filtered to provide a filtration cake and a filtrate.

BRIEF SUMMARY OF THE INVENTION

The present invention is based on an appreciation, by the present inventors, of the fact that the extraction of nitrogen, potassium and phosphorus from animal waste material is substantially enhanced if the treatment is performed promptly after the production of the waste material by animals.

More particularly, potassium is present in animal waste material in the form of an insoluble potassium urate. The present inventors have found that a substantial amount of the potassium in animal waste material can be extracted in a solid form, as potassium urate, before microbial action breaks down the potassium urate to leave potassium and ammonium in solution. Extracted urates are then available for inclusion in a fertilizer. When the fertilizer is used on land, the microbes in the soil break down these urates, releasing the potassium and ammonia, but at a rate less than that at which these nutrients would be released in the soil if dissolved in water.

Consequently, by extracting ammonium-nitrogen and potassium in the form of urates and/or other compounds from the waste material while they remain in solid, e.g. crystalline form, i.e. before they break down to release these substances, a substantially improved extraction of these substances can be achieved The inventors have also found that phosphorous can, to a large extent, be removed from the slurry by separation of the slurry into solid material and liquid.

According to the present invention, therefore, there is provided a method of treating animal waste material which comprises the steps of:

a) flocculating the waste material;

b) processing the flocculated slurry to separate the slurry into liquid and solid material and thereby to extract a major portion of ammonium-nitrogen and potassium from the slurry, within a sufficiently short period of time, preferably 12 hours, following the production of the waste material by animals, that the extracted potassium and ammonium-nitrogen remain bound in solid compounds;

c) processing the liquid to extract further potassium and ammonium therefrom; and d) drying the solid material.

A major portion, or even all, of the phosphorous in the slurry can be extracted with the solid material in step b) in solid form, and any remainder can be subsequently extracted by adding lime to the liquid.

Urates in the liquid subsequently break down to leave potassium and ammonium in solution, which can be extracted by adsorption in zeolite, and the zeolite can then be dried and employed as fertilizer.

Since urea in urine and faeces takes a few hours to break down and allow the release of ammonium-nitrogen under the action of urease enzymes produced by microbes, the processing of the liquid in step c) is effected promptly, and preferably within 24 hours of the production of the waste material by animals, while at least most of the ammonium-nitrogen remains trapped in solution, and consequently a major portion, or even all, of the total amount of ammonium-nitrogen in the slurry can be extracted and may be utilized, for example, as a valuable fertilizer component. Further ammonium remaining in the liquid can be adsorbed e.g. in the zeolite with the potassium and subsequently incorporated in the fertilizer.

The prompt treatment of the slurry according to the present invention avoids any necessity for chemicals to be added to the slurry to inhibit the creation of ammonium or other noxious gases. The present invention may be employed to convert the slurry into a dry, high-value natural fertilizer without exhausting polluting gases, e.g. ammonium, methane and hydrogen sulfide, to the atmosphere, and by returning all of the water extracted from the waste material for use, for example, as flush water or drinking water. The present invention eliminates the need for long-term storage lagoons and land disposal requirements, and can be arranged to extract a higher proportion of ammonium-nitrogen, phosphorus and potassium from the waste material than has been possible hitherto and without the use of noxious chemicals employed in some prior art processes.

In one embodiment of the invention, incoming waste material is pre-treated with either ferrous sulphate, polymer or lime before transfer to a vacuum and heat-assisted plate filter press, where it is filtered to produce a filter cake and a filtrate. Approximately 99.9% of suspended solids, 99.5% of the phosphorus content of the waste material and up to 69% of the potassium content are retained in the filter cake. The filtrate is passed to an ammonia stripper and scrubber to produce ammonium sulphate, which in turn is added to the filter cake before subsequent drying of the filter cake. In this way, more than 98% of the nitrogen present in the original waste material is recovered. The liquid is then passed through a zeolite column to capture some of the remaining ammonium-nitrogen and potassium from the liquid. When the zeolite becomes saturated, it is preferably dried and sold as a nutrient enhanced soil conditioner.

The liquid is then exposed to an ultraviolet system for sterilization before transfer, for example, to a drinking water and/or flush water system in a barn or for use in irrigation.

Lime used for pH control in the ammonium stripping is returned to the drying stage for incorporation into the filter cake.

The present method of waste material has the advantage that it eliminates biological treatment and the use of lagoons, and also subsequent disposal of liquid waste on land, which have been employed in prior art systems. The present method is independent of weather at all times of the year and eliminates any threat of lagoon spillage and lagoon leakage, and possible overloading of the water table by disposal errors.

The present method may be performed so as to produce a dry, storable fertilizer product containing the nitrogen, phosphorus and potassium, originally contained in the waste material, in a form acceptable to EPA Rule 503 for pathogen reduction in bio-solids.

The present method does not require the disposal of any waste material and can therefore be described as a zero-discharge method which allows solids and nutrients to be shipped off immediately as high-value fertilizer.

The present method does not discharge polluting gases into the atmosphere and is preferably carried out in a closed building to enable odour from spills and accidents to be controlled. By avoiding biological treatment, which requires considerable time, the present chemical/mechanical method expedites the treatment process and returns all liquid pathogen-free to the operation immediately, thus allowing for mingling of waste streams from various operations by pipeline to a central facility, and thereby getting economies of scale while retaining water conservation benefits.

The extraction of a large percentage of potassium from the waste material at an early stage allows the use of zeolite to adsorb the remaining ammonium and potassium to complete a closed-loop system. The zeolite can be dried and sold separately, as can the ammonium salts.

BRIEF DESCRIPTION OF THE DRAWINGS

The invention will be more readily understood from the following description of embodiments thereof given, by way of example, with reference to the accompanying drawings, in which.

DESCRIPTION OF THE PREFERRED EMBODIMENTS

Figure 1:
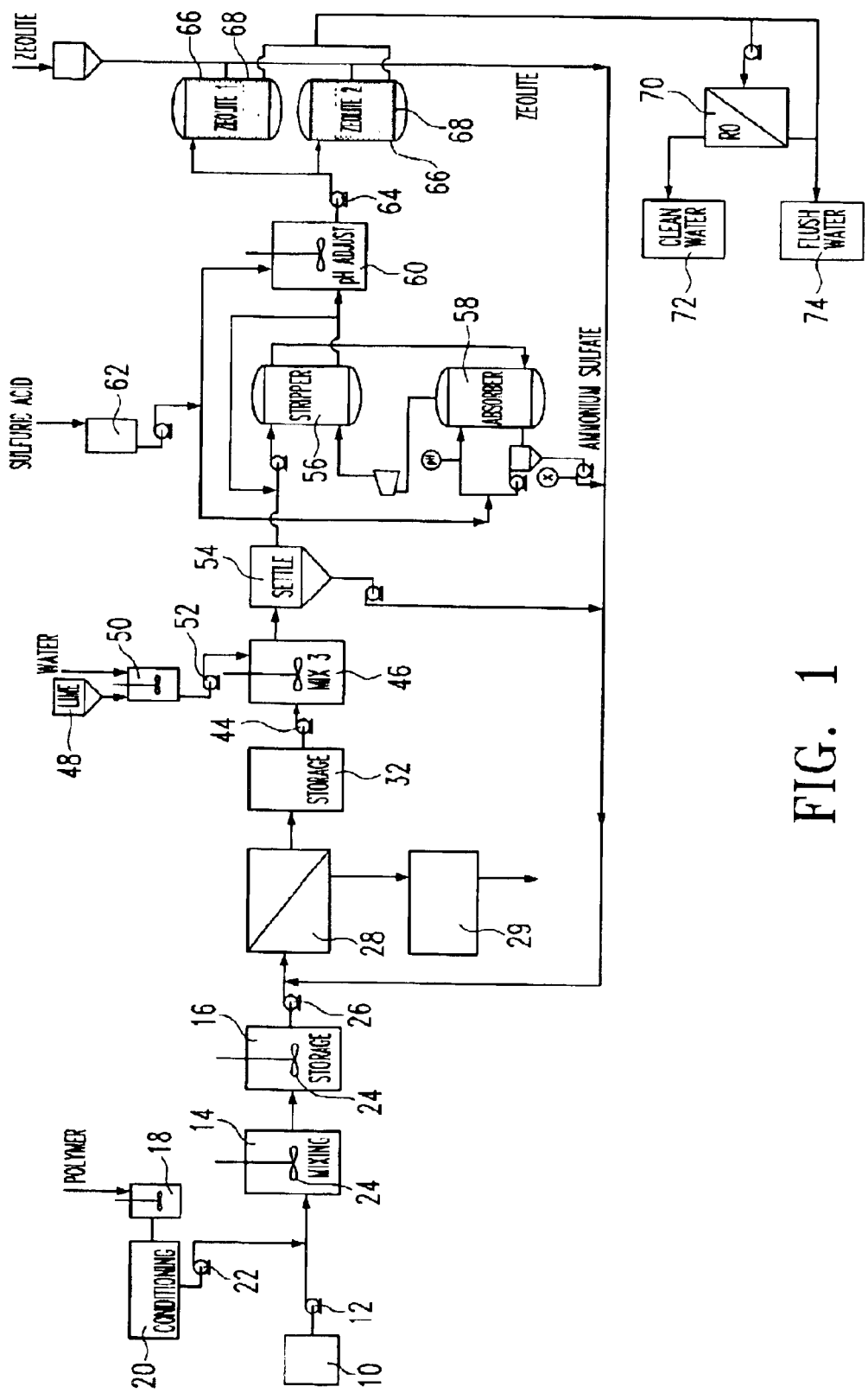
FIG. 1 shows a block diagram of a first waste material treatment plant employing the method according to the present invention.

In FIG. 1, there is shown a holding tank 10 in which animal waste material, obtained for example from a barn, is collected. A pump 12 feeds the waste material from the holding tank 10 to a mixing tank 14, from which the material passes to a storage tank 16.

A polymer, for use as a flocculating agent, is introduced into a mixing tank 18, and passes from the mixing tank 18 into a storage tank 20, from which it is fed by means of a pump 22 into the tank 14. The tanks 14 and 16 are provided with agitators 24 for promoting flocculation of the waste material by the polymer, the agitator 24 in the tank 14 being driven at a faster speed than that in the tank 16.

From the storage tank 16, the waste material is fed by a pump 26 to a liquid/solids material separation unit 28, which is described in greater detail below, and from which solid material extracted from the waste material is fed to a pelletizer 29. Liquid from the separation unit 28 passes to a storage tank 32, from which it is supplied by a pump 44 to a mixing tank 46.

Lime fed through a hopper 48 and mixed with water in a mixing tank 50 is supplied by a pump 52 to the tank 46, the contents of which are agitated for thorough mixing before passing into a clarifier 54 the decant of the waste is then sent to an air stripper 56, which removes ammonium from the liquid in a stream of air, in a known manner. This air is then passed to a scrubber 58 which removes the ammonia from the air, by exposure to an acid, e.g. sulphuric acid, to create ammonium sulphate, for recycling into the waste material being fed from the pump 26 to the liquids/solids separator unit 28.

From the air stripper 56, the liquid passes through a pH adjustment tank 60, which is supplied with sulphuric acid from a tank 62.

A pump 64 feeds from the tank 60 to a pair of tanks 66 containing zeolite columns 68, which serve to absorb ammonium and potassium from the liquid.

From the tanks 66, the liquid is fed to a reverse osmosis unit 70 for removing bacteria and parasites, after which a portion of the water passes, as potable water, to a tank 72, while the remainder passes to a flush water tank 74.

Figure 2C:
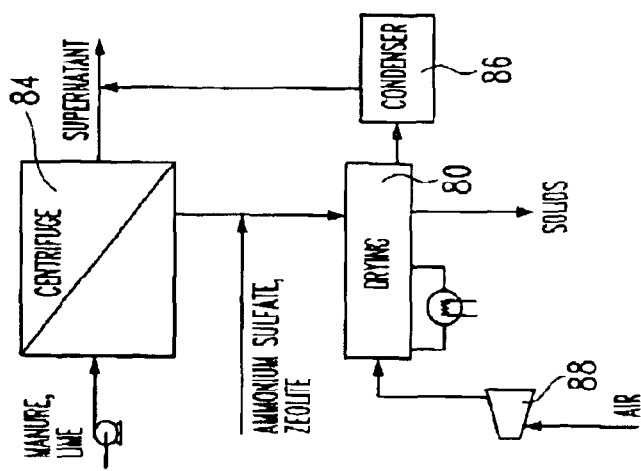
FIGS. 2A, 2B and 2C show block diagrams of three alternative liquid/solids separator and solids-drying arrangements for use in the plant of FIG. 1.
Figure 2B:
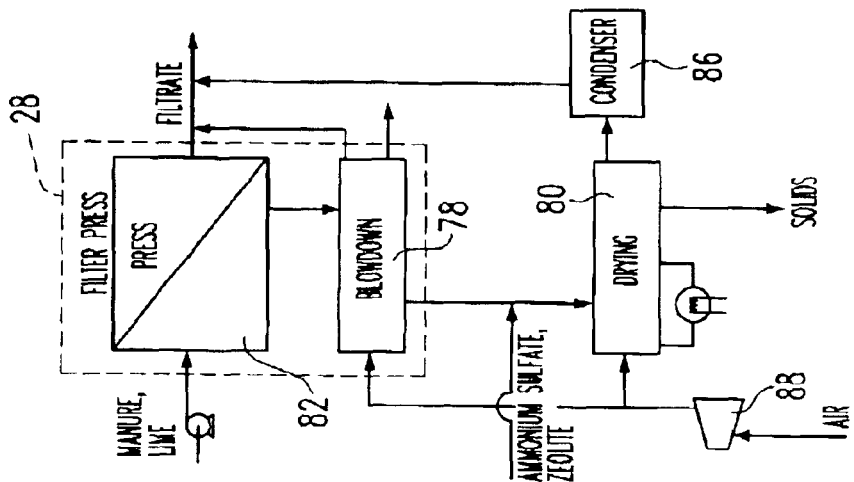
Figure 2A:
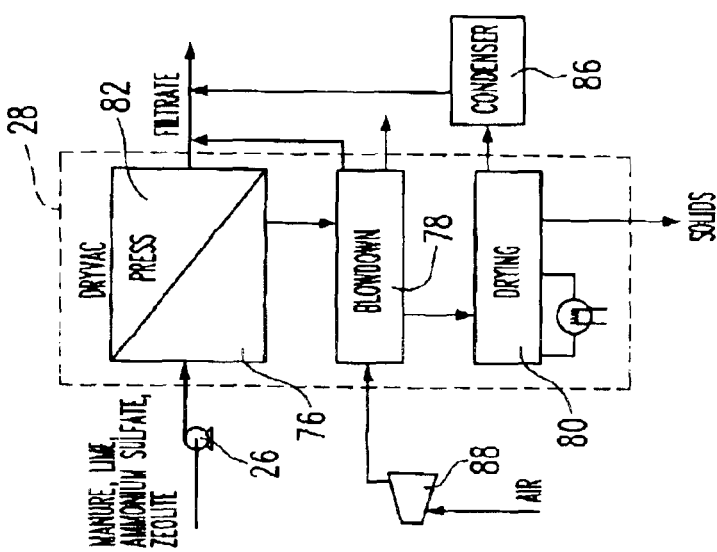

FIG. 2A shows an embodiment of the liquid/solids separator unit 28 comprising a vacuum enhanced plate filter press 76, from which the filter cake is supplied to a dryer 80, where pathogens in the filter cake are killed by heat and from which the dried material passes to the pelletizer 29.

FIG. 2B shows a modification of the liquid/solids separator unit 28 which employs a filter press 82, to which a mixture of manure and lime is supplied and from which a filter cake is transferred to dryer 80. The filter cake is mixed with ammonium sulphate and zeolite before transfer to the dryer 80.

A third alternative is shown in FIG. 2C, in which the liquid/solids separator device shown as a centrifuge 84, to which a mixture of manure and lime is supplied, and which outputs its filter cake, to be mixed with ammonium sulphate and zeolite, directly into the dryer 80.

In each of these three cases, vapour from the dryer 80 is fed to a condenser 86, from which condensate is returned to the liquid filtrate.

A fan 88 supplies air to blow-down device 78 in FIGS. 2A and 2B and the dryer 80 of FIGS. 2B and 2C.

Figure 3:
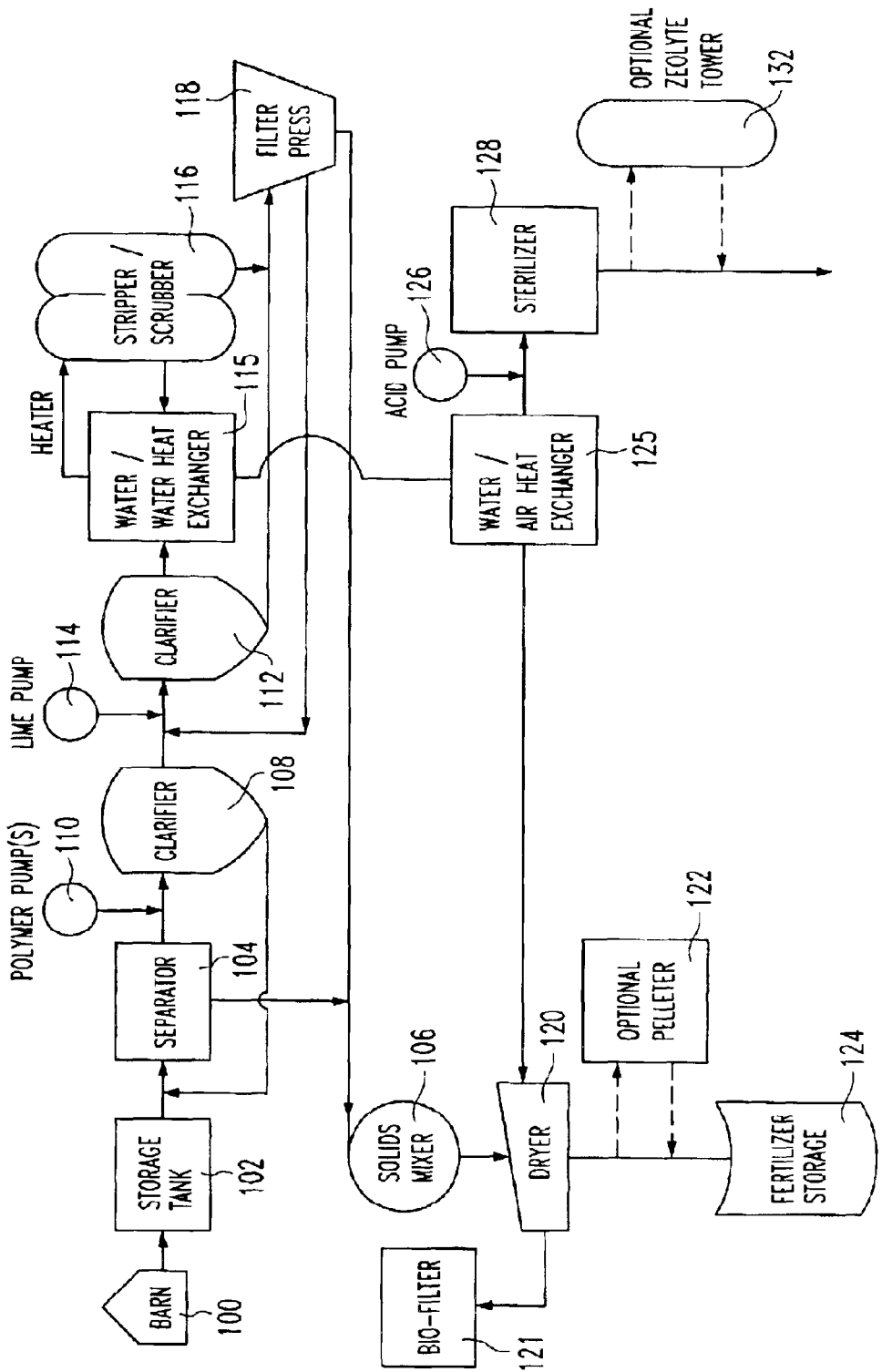
FIG. 3 shows a block diagram of a second waste material treatment plant employing the method according to the present invention.

In FIG. 3, which shows a modified plant for performing the method according to the present invention, reference numeral 100 indicates a barn in which animal waste is produced and from which this waste is transferred to a storage tank 102.

From the storage tank 102, the waste material is passed to a separator 104, which separates the waste into solid waste material, which is transferred to a mixer 106, and liquid waste material, which passes into a first clarifier 108. One or more polymer pumps, indicated by reference numeral 110, add flocculating polymer material to the liquid waste material as the latter is transferred to the first clarifier 108. Sludge formed in the first clarifier 108 is recycled to the separator 104.

From the first clarifier 108, the clarified liquid is passed into a second clarifier 112 with the addition of lime from a lime pump 114 to adjust the pH value of the liquid and to assist in further precipitation of remaining suspended solids.

After further clarification in the second clarifier 112, the liquid passes through a heat exchanger 115 to an ammonia stripper/scrubber unit 116, which is a commercially available unit sold by Delta Cooling Towers, Inc., of Fairfield, N.J. and in which ammonia is extracted from the liquid in an air stream and combined with an acid, e.g. sulphuric or nitric acid, to form ammonium salts and water. The ammonium separation in the stripper/scrubber unit 116 can be affected by both a rise in temperature and a rise in pH. Economics will decide on the appropriate mix of the two. The warm stripped liquids may transfer their heat to the incoming liquids to this stage. This reduces the temperature of the processed liquids to approximately 25° C. The ammonium sulphate from the stripper/scrubber unit 116 is mixed with lime sludge from the second clarifier 112, and the mixture is fed to a filter press 118.

Solids from the filter press 118 pass to the mixer 106, and the filtrate from the filter press 118 is recycled to the second clarifier 112.

From the mixer 106, the mixed solids pass through a dryer 120, the dried output of which may be pelletized in an optional pelletizer 122 before being stored as fertilizer in a fertilizer storage container 124.

Hot water from the heat exchanger 115 flows to through a heat exchanger 125, where it heats air which is then supplied to the dryer 120, and from the heat exchanger 125 the water, mixed with acid from an acid pump 126, passes through a sterilizer 128 on its return to the barn 100.

Between the sterilizer 128 and this barn, the water may be passed through an optional zeolite tower 132.

The hot air from the heat exchanger may thus be used to dry the solids, zeolite and ammonium salts separately, prior to pelletizing and packaging. In this case the pathogen kill requirements of EPA Rule 503 can be achieved by warming the solids to 85° C. for 15 seconds, e.g. by employing auxiliary drier, microwave energy, extruders, before storage and packaging.

Should the operator not wish to recycle all of the water, that portion not required for flushing and washing can be stored for irrigation or treated further to meet surface water discharge standards for the relevant location.

Supplemental nutrients can be added at any step prior to pelletizing to bring the analysis up to customer requirements.

In order to achieve a closed loop zero discharge system, all nutrients are preferably extracted from the liquid stream along with the solids. Potassium is highly soluble and, although currently not thought to be a pollutant when discharged, cannot be allowed to build up in a closed system. Prior art has shown that on occasion amounts approximating 50% of the potassium have been removed without offering the conditions under which this can be achieved on a regular basis.

Employing the above-described methods, it has been found that a single pass through the treatment plant resulted in the following averages:

Ammonium removed—98%
Phosphorus—removed 98%
Potassium—removed 76%
Total Suspended Solids—undetectable (100% removed)

By utilizing a closed loop stripper/scrubber unit with recirculated air, the amount of ammonia removed can be increased to 99.5%. Lime treatment prior to the stripper/scrubber unit can increase the amount of phosphorous removed to substantially 100%. Also, the use of stable state recirculated water will improve the amount of potassium removed.

Subsequent passes of liquids in a closed loop environment may increase the nutrient removal to substantially 100%.

Test results have achieved potassium extractions exceeding 63% and phosphorus extractions exceeding 99% at the solids separation step when the waste was fresh, i.e. less than 24 hours old. It would appear that potassium, ammonium and sodium are combined loosely with uric acid to form slightly insoluble urates in the waste material. This loose bond is broken by heat and bacterial activity upon defecation. It is therefore possible to extract a large amount of the potassium, some phosphorus and some ammonium as a solid before bacterial activity makes it difficult and expensive to do so. Breaking of the bond by bacterial activity can be postponed for a short period of time by the addition of proper urease inhibitors in the tank 102 (FIG. 3) or to gutters and sumps in the barn 100.

It is important to convert as much ammonium as possible prior to the zeolite filter. The remaining ammonium will be exchanged in priority to potassium, thereby reducing the potassium attracting capabilities.

It may be useful in flushed systems to maintain a slightly acidic environment, i.e. pH<=6, below the slotted floors.

This will reduce ammonium discharge to the air in the barn 100 on occasions when the waste cannot be treated on schedule.

The above-described embodiment of the present invention may be implemented to provide the following advantages:

1. As indicated above, the present method may be performed in a closed loop system with zero discharge. A closed loop system requires the clearing of waste water elements that over time will build to a nuisance level in the water being recycled. It takes many passes through the system for the liquids to reach a steady state. A zero discharge system implies no discharge to the environment, e.g. gaseous discharges to the air or discharges of nutrient-rich water. There is one discharge point, i.e. the bio-filtered air from a drier 121 (FIG. 3).

2. The present method is quick and reliable in all weather, whereas prior art biological treatments, whether aerobic or anaerobic, take too long and are not reliable in all weather.

3. Pathogen kill in the solids can be achieved in accordance with US EPA Part 503 Biosolids Rule. (EQ) (Exceptional Quality) Class A Pathogen Reduction.

4. In order to avoid discharge of water to the environment, all water may be recycled to the operation.

5. The present invention allows scalable design and used may be employed at all levels of bog operations. Economies of scale may be achieved with centralized facilities connected by pipeline.

6. Payback may be obtained through fertilizer sales.

7. The present method is simple in operation and the treatment plants employing the present method can therefore be repaired with common tools and knowledge supplemented by equipment supplier expertise and direction when required.

8. Some jurisdictions currently require an operator to either own all or a substantial portion of the land required for liquid manure disposal. The present invention eliminates this investment requirement.

Furthermore, the present method may be employed so as to establish a sustainable operation on the footprint of a barn and treatment facility by eliminating long term storage under the barn or in lagoons, by eliminating land disposal, and by reducing emission of greenhouse gases and ammonia by eliminating anaerobic activity.

We claim:

1. A method of treating animal waste material in the form of a slurry, which comprises the steps of:

a) flocculating the slurry;

b) processing the slurry, within a sufficiently short period of time following the production of the waste material by animals that urates of potassium and ammonium remain in solid form, to thereby separate the slurry into solid material, comprising potassium urate and ammonium urate, and liquid;

c) processing the liquid to extract dissolved phosphorous from the liquid;

d) processing the liquid to extract further potassium and ammonium from the liquid;

e) combining the phosphorous, potassium and ammonium extracted in steps c) and d) with the solid material separated in step b) to form a mixture; and f) drying the mixture.

2. A method as claimed in claim 1, in which step d) comprises stripping and acid scrubbing the liquid to produce ammonium salts.

3. A method as claimed in claim 2, which includes adding the ammonium salts to the solid material.

4. A method as claimed in claim 1, in which step c) includes adding lime to the liquid to extract further phosphorous and precipitate remaining dissolved solids and suspended solids from the liquid.

5. A method as claimed in claim 1, wherein step d) includes employing zeolite to adsorb remaining ammonium and potassium from the liquid.

6. A method as claimed in claim 5, in which step c) includes adding zeolite, with adsorbed ammonium and potassium, and ammonium salts to the solid material separated in step b) before step f).

7. A method as claimed in claim 1, wherein step b) is completed within 12 hours following the production of the waste material by animals.

8. A method as claimed in claim 1, which includes performing steps a) through f) in a closed loop zero discharge system.

9. A method as claimed in claim 1, which includes performing steps a) through f) without releasing any gaseous pollution to the atmosphere.

10. A method as claimed in claim 1, at it which step a) comprises treating the material with a substance selected from the group consisting of ferrous sulphate, polymer and lime.

11. A method as claimed in claim 1, which includes treating the waste material with acid to reduce the pH of the waste material to less than 6 prior to step b).

* * * * *